United States Patent [19]

Simpson et al.

[11] Patent Number: 5,469,549

[45] Date of Patent: Nov. 21, 1995

[54] COMPUTER SYSTEM HAVING MULTIPLE ASYNCHRONOUS PROCESSORS INTERCONNECTED BY SHARED MEMORIES AND PROVIDING FULLY ASYNCHRONOUS COMMUNICATION THEREBETWEEN

[75] Inventors: Hugo R. Simpson; Eric R. Campbell, both of Stevenage, Great Britain

[73] Assignee: British Aerospace Public Limited Company, London, England

[21] Appl. No.: 778,073

[22] PCT Filed: Apr. 12, 1991

[86] PCT No.: PCT/GB91/00578

§ 371 Date: Dec. 9, 1991

§ 102(e) Date: Dec. 9, 1991

[87] PCT Pub. No.: WO91/16681

PCT Pub. Date: Oct. 31, 1991

[30] Foreign Application Priority Data

Apr. 12, 1990 [GB] United Kingdom ............... 90083668

[51] Int. Cl.⁶ ..................................................... G06F 13/00
[52] U.S. Cl. ................... 395/200.08; 395/285; 395/308; 395/303; 395/474; 395/475; 395/476; 395/650; 395/200.03; 364/238.6; 364/239; 364/DIG. 1; 364/270.5; 364/270.7; 364/939; 364/950.1
[58] Field of Search .................................. 395/800, 600, 395/425, 325, 200, 250

[56] References Cited

U.S. PATENT DOCUMENTS

| 3,566,363 | 2/1971 | Driscoll, Jr. ............................ | 395/425 |
|---|---|---|---|
| 4,264,953 | 4/1981 | Douglas et al. ....................... | 395/400 |
| 4,414,624 | 11/1983 | Summer, Jr. et al. ................. | 395/650 |
| 4,543,627 | 9/1985 | Schwab .................................. | 395/200 |
| 4,547,880 | 10/1985 | Devita et al. ........................... | 370/91 |
| 4,567,560 | 1/1986 | Polis et al. ............................. | 364/184 |
| 4,631,667 | 12/1986 | Zulian et al. ........................... | 395/325 |
| 4,648,035 | 3/1987 | Fava et al. .............................. | 395/400 |
| 4,769,769 | 9/1988 | Bolt et al. ............................... | 395/250 |
| 4,845,744 | 7/1989 | DeBenedictis ......................... | 379/221 |

(List continued on next page.)

FOREIGN PATENT DOCUMENTS

| 0123509 | 10/1984 | European Pat. Off. . |
|---|---|---|
| 125773 | 11/1984 | European Pat. Off. . |
| 239324 | 9/1987 | European Pat. Off. . |
| 1490612 | 11/1977 | France . |
| 8400221 | 1/1984 | WIPO . |

OTHER PUBLICATIONS

Simpson, "Mascot Real Time Networks in Distributed System Design", Nov. 1990, pp. 1–10.
Simpson, "Data Orientated Requirements Implementation Scheme (DORIS)", Oct., 1988, pp. 1–3.
Simpson, "Four–Slot Fully Asyncronous Communication Mechanism", Jan. 1990, pp. 17–30.
IEEE Micro, vol. 6, No. 3, Jun. 1986 New York U.S.—pp. 72–77; Michael D. Rap: "Microstandards. P1296: The interprocessor communication standard".
Review Of The Electrical Communication Laboratories. vol. 34, No. 5, Sep. 1986, Tokyo JP pp. 569–575; Akihiko Matsumoto: "DIPS Computer complex".
Michael D. Rap et al, "MicroStandards", IEEE, 1986, 72–77.

Primary Examiner—Thomas G. Black
Assistant Examiner—Paul Harrity
Attorney, Agent, or Firm—Cushman, Darby & Cushman

[57] ABSTRACT

A multi-processing computer system has multiple computing units. Each of the computing units includes a processor linked to a private memory via a private data bus, and each computing unit is linked to every other computing unit by a respective separate independent shared memory area. The shared memory areas are controlled by a communications controller which can provide a fully asynchronous two-way communication route through the memory area. The multitasking capabilities of the computer are further controlled by a set of unit controllers in combination with respective software task schedulers.

16 Claims, 2 Drawing Sheets

U.S. PATENT DOCUMENTS

| | | | |
|---|---|---|---|
| 4,875,224 | 10/1989 | Simpson | 375/371 |
| 4,901,230 | 2/1990 | Chen et al. | 395/325 |
| 4,922,418 | 5/1990 | Dolecek | 395/575 |
| 4,943,911 | 7/1990 | Kopp et al. | 395/375 |
| 5,027,271 | 6/1991 | Curley et al. | 395/725 |
| 5,123,094 | 6/1992 | MacDougall | 395/375 |
| 5,167,028 | 11/1992 | Shires | 395/425 |
| 5,179,665 | 1/1993 | Roslund et al. | 395/250 |
| 5,214,759 | 5/1993 | Yamaoka et al. | 395/200 |

COMPUTER SYSTEM HAVING MULTIPLE ASYNCHRONOUS PROCESSORS INTERCONNECTED BY SHARED MEMORIES AND PROVIDING FULLY ASYNCHRONOUS COMMUNICATION THEREBETWEEN

BACKGROUND OF THE INVENTION

1. Field of the Invention

The present invention relates to digital computer systems and, more specifically, to systems having multiple independent processors.

2. Description of the Related Art

There is a continuing growth in the amount of computer power required to support digital data processing applications. One response to this problem is to develop larger, faster and more complex single processors; another is to couple multiple processors together, for example by high speed data buses.

With existing forms of computer system using intercommunicating multiple processors, various problems arise and the object of the present invention is to provide an alternative multi-processor system, preferably incorporating an integrated associated hardware/software system concept, which may be preferred for some application areas.

SUMMARY OF THE INVENTION

According to the invention, there is provided a distributed computer system comprising:

- a plurality of asynchronous computer units each with a data processor and a private data memory linked to the processor by way of a private data bus;
- shared data memory means having access ports linked to respective ones of the computer units via the associated private data buses for each computer unit to be able to communicate with any other computer unit by way of a respective two-way data route comprising a respective individual area of shared data memory; and
- communication control means connected to the private data buses and the shared data memory means for responding to control data issued by the processor of any computer unit to initiate communication via a route determined by the processor.

BRIEF DESCRIPTION OF THE DRAWINGS

For a better understanding of the invention, reference will be made, by way of example, to the accompanying drawings, in which.

DETAILED DESCRIPTION OF THE PRESENTLY PREFERRED EXEMPLARY EMBODIMENTS

In connection with the system to be described, reference will be made to a so-called Data Interaction Architecture (DIA), following the emphasis on the data which lies between concurrent system processes. The term Architecture is used in the sense of the elements, and their interconnection and grouping, which go to make up a digital data processing system. Essentially these elements are the software processes and hardware processors which communicate through shared data areas declared in shared memory. Thus, the DIA covers multi-tasking software as well as multi-processing; hardware implementation. The DIA can be seen as an integrating technology which provides a framework for system and component design. It is a general approach which is usable with a wide range of processor types and programming languages.

In a computer system, inter-process and inter-processor communication may be direct, i.e. in total synchronism with the "reading and writing" processes being locked together at the point of communication. Data independent of the processes cannot exist since there is no data area (or process) which can hold information in transit. This is the rendezvous style of communication which naturally introduces severe timing interdependences between the two processes. A monitor process can be interposed in the communication path so as, in effect, to decouple the operation of the reader and writer processes, but this is only at the expense of significant additional overheads and cannot entirely remove the timing interactions.

Figure 1:
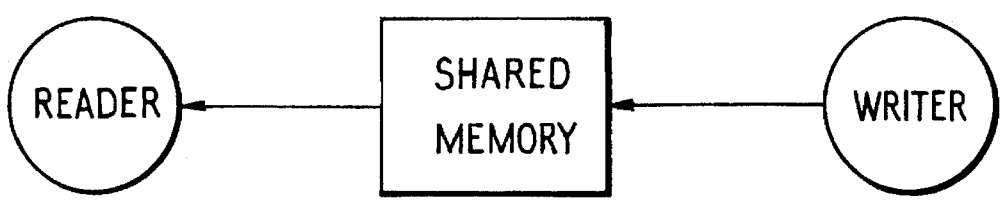
FIG. 1 is a diagram for explaining the general nature of inter-process communication used in the present invention.

The system to be described, i.e. DIA, comprises a real time network where communication via shared memory, i.e. it is indirect as shown in FIG. 1. This form of communication is more flexible than those referred to above in that it can be used to provide a wide range of communication protocols including; fully and conditionally asynchronous, loosely synchronous (the bounded buffer) and fully synchronous (the rendezvous) forms. Asynchronous and loosely synchronous protocols avoid the tight interlocked timing relationships implicit in the rendezvous, and significantly reduce the risks of deadlock and severe performance degradation at run time. However, DIA does not prejudge the optimum implementation form; all protocols are supported so that the system designer can select the most appropriate for the application in hand.

Software structure in DIA is modelled on the known MASCOT (Modular Approach to Software Construction Operation and Test) form of real time network. MASCOT is a software design method based on data flow concepts and Is described, for example, in the articles "Process Synchronisation in Mascot" by H. R. Simpson and K. Jackson, Computer Journal, 1979, 22, (4), pp 332–345 and in "The Mascot Method" by H. R. Simpson, Software Engineering Journal, 1986, 1, (3), pp 103–120. It has the important advantage of allowing the distribution of system functionality to be represented, so providing the means both of controlling the mapping of software designs into distributed hardware and of allowing real time properties to be analyzed in terms of information propagation effects.

Individual MASCOT processes are known as ACTIVITIEs. Each ACTIVITY is conceptually independent, i.e. it runs concurrently with all other ACTIVITIEs. In practice, where ACTIVITIEs share a processor, a scheduler must be provided together with the synchronization primitives to support mutual exclusion and cross stimulation.

MASCOT shared data areas, through which the ACTIVITIEs communicate, are known as Intercommunication Data Areas (IDAs) and there are two principal classes. The POOL form of IDA is used to hold reference data which is maintained by one or more updating processes to be consulted by one or more using processes with minimal timing interference. The CHANNEL form of IDA is used to pass messages between one or more producing processes to one or more consuming processes. POOLs are essentially asynchronous whereas CHANNELs are synchronous.

An important DIA extension to MASCOT is the ROUTE concept. A ROUTE is used to provide communication between a single writing process and a single reading process, and it is equivalent to either a POOL (asynchronous communication between an updater and a user) or a CHANNEL (synchronous communication between a producer and a consumer). ROUTEs are used to express abstract communication designs and can be mapped into the hardware in a variety of forms which meet the communication requirements regardless of the relative location of the ACTIVITIEs connected by the ROUTE. DIA provides special executive software and hardware facilities to support the ROUTE concept.

Figure 2:
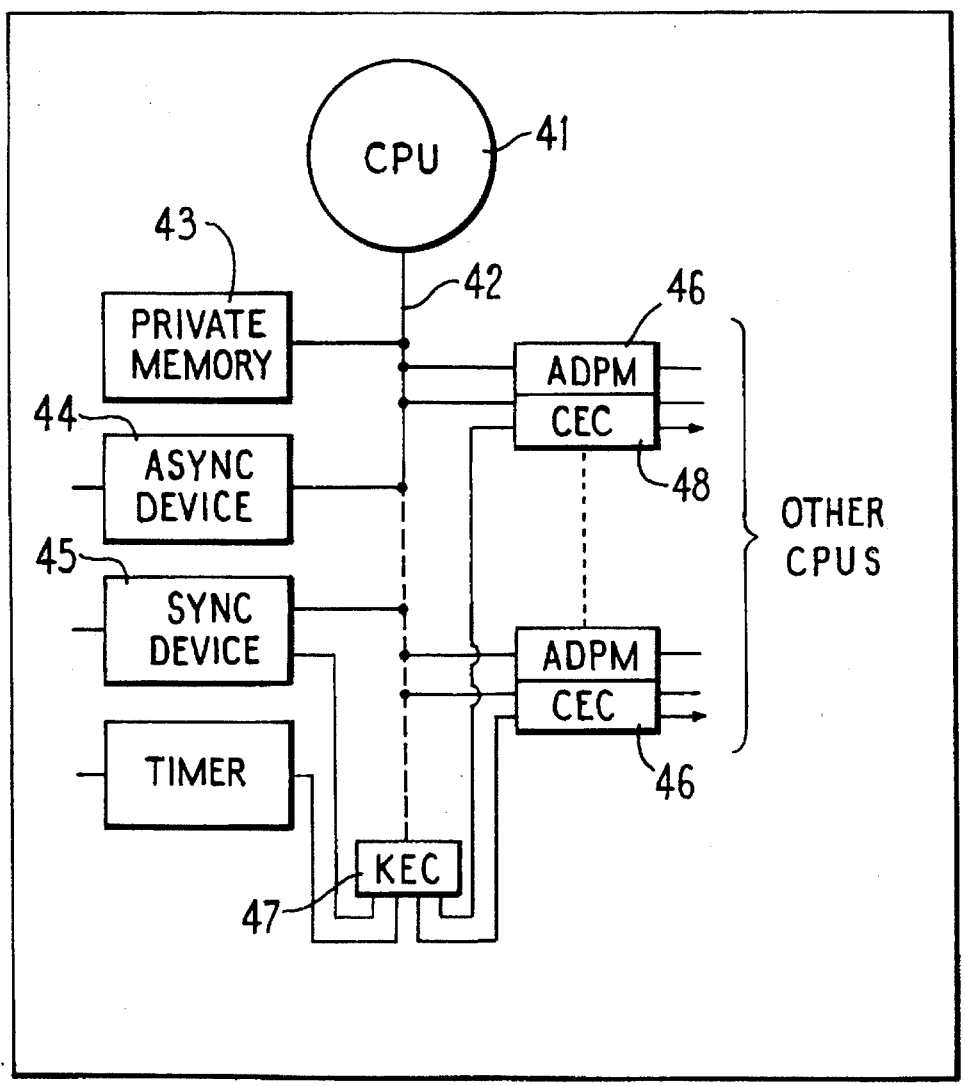
FIG. 2 is a simplified diagram of part of a computer system.

The DIA processing configuration is shown in FIG. 2. Ideally the Central Processing Unit (CPU) 41 is a relatively simple form of Reduced Instruction Set Computer (RISC) in which no use is made of features which introduce non-deterministic timing effects such as interrupts, caching and the like. More complex computers can be used but this will make it more difficult to analyze run time properties.

The central vertical line 42 in FIG. 2 depicts the CPU's private memory bus. This Elves access to: Private Memory (containing private network elements) 43, Asynchronous Devices (peripherals) 44, Synchronous Devices (peripherals which can generate an external stimulus) 45, a series of Asynchronous Dual Port Memories (ADPM—containing shared IDA elements) 46 and two sorts of specialised VLSI devices, namely a Kernel Executive Chip (KEC) 47 and for each memory 46, a Comms Executive Chip (CEC) 48.

The KEC supports the multi-tasking facilities needed when many activities are mapped into a single processor (Processor=CPU+private memory). It is also able to accept external stimuli which are demands for processing arising outside the processor (e.g. from Synchronous Devices, Timers, CECs, etc). External stimuli can be regarded as cooperative interrupts; they allow external demands to be taken into consideration at each reschedule point (the success of this strategy is clearly dependent on the accurate prediction of maximum slice times, and on the provision of special processors to handle any fast reaction time requirements). Different functions on the KEC are invoked by write or read access to different addresses assigned to the chip (this allows the chip to provide its function when interfaced to a wide variety of CPU types).

Communication with an adjacent processor is provided by an ADPM-CEC pair. Each ADPM has two entirely independent access paths to the memory locations, thus avoiding the need for any form of arbitration at the basic hardware level (data integrity is maintained by the CEC and software executive (see below)). Like the KEC, selection of functions on the CEC is by means of write and read operations to specific addresses, with an additional facility to select one of many CECs by use of a unique value in the data field of a write operation. Some CEC operations generate external stimuli which are passed to the KEC of an adjacent processor (this is needed for the synchronous ROUTEs between adjacent processor pairs). The two interfaces of a CEC, one for each of the connected processors, provide identical facilities and, like the ADPM, no arbitration is needed. Multi tasking facilities, in the shape of KEC and software scheduler, provide the means by which the CPU in each processor is shared between resident ACTIVITIEs.

The KEC is able to register demands for processing and to select the next ACTIVITY to be allocated CPU time. The KEC currently available provides scheduling support for up to 64 ACTIVITIEs arranged in 8 priority levels with 8 ACTIVITIEs at each level. External stimuli are routed through (indirectly) to the highest priority level. The selection strategy consists of choosing an ACTIVITY from the highest priority level containing a demand for processing; where there is more than one demand at this level then a round robin search is used to select the next ACTIVITY (the chip remembers the last ACTIVITY scheduled at each level). The chip indicates the next ACTIVITY to be scheduled by returning a number in the range 0..63; if there is no current demand then 64 is returned.

The KEC contains two primary control bits for each ACTIVITY. The first is the start bit which must be set for an ACTIVITY to be a candidate for scheduling. This provides an overall control and can be used to implement the MASCOT control commands. The second bit is the stim bit which is used to denote a current demand for scheduling. External stimuli are held on the chip and are entered into the schedule at a suitable point (see below).

The principal form of interaction between the KEC and the software scheduler make use of the following chip operations (all of which execute in a single memory access, although they are portrayed as PROCEDUREs or FUNCTIONs for the purposes of explanation):

a. PROCEDURE kec_suspend; The external stimuli are accepted into the schedule (by setting the stim bit for any outstanding external demand). The slim bit for the current activity is reinstated, registering a request for further processing.

b. PROCEDURE kec_wait; Same as for kec_suspend except that the stim bit is not reinstated.

c. PROCEDURE kec_stim (act: 0..63); This supports internal stimuli whereby one ACTIVITY can set the slim bit of another.

d. FUNCTION kec_nextact: 0..64; This returns the number of the next ACTIVITY to be scheduled and it clears the external stimulus demands where these have been accepted into the schedule, and it then clears the slim bit of the ACTIVITY selected for scheduling.

The external stimuli are potentially asynchronous and the KEC and associated software ensure that the attendant metastability hazard is reduced to a negligible level (it is effectively eliminated). This is achieved by the delay which must exist between acceptance of the external stimuli by kec_suspend or kec_wait, and the use of kec_nextact to select the next ACTIVITY.

The software scheduler which interfaces with the KEC is particularly straightforward. First we introduce some auxiliary definitions:

a. VAR curract: 0..64; This is a variable which holds the number of the currently scheduled ACTIVITY.

b. PROCEDURE save; This procedure saves the context of the ACTIVITY whose number is indicated by the value of curract. It is assumed that space has been set aside for this purpose. The context of an ACTIVITY is initialized so that the ACTIVITY is first entered at its start point.

c. PROCEDURE restore; This procedure restores the context of the ACTIVITY whose number is indicated by the value of curract.

Scheduling primitives which interface directly with the KEC by the value can now be formulated:

```
a. PROCEDURE suspend;
   BEGIN
      kec_suspend;
      save;
      curract := kec_nextact;
      restore
   END;
b. PROCEDURE wait;
   BEGIN
      kec_wait;
      save;
      curract := kec_nextact;
      restore
   END;
c. PROCEDURE stim (act : 0 . . 63);
   BEGIN
      kec_stim (act)
   END;
```

We are now in a position to see how cross stimulation and mutual exclusion, the basic synchronization primitives, can be provided.

A control_node record type is introduced to provide a control point at which an ACTIVITY may wait, to be stimmed into operation by another ACTIVITY:

```
a. TYPE control_node =
   RECORD
      activity : 0 . . 63;
      waiting : BOOLEAN
   END;
``` where waiting is initialized to FALSE. The cross stimulation facility is provided thus:

```
b. PROCEDURE wait_cn (VAR cn : control_node);
   BEGIN
      cn.activity := curract;
      cn.waiting := TRUE;
      wait
   END;
c. PROCEDURE stim_cn (VAR cn : control_node);
   BEGIN
      IF cn.waiting THEN
      BEGIN
         stim (cn.activity);
         cn.waiting := FALSE
      END
   END;
```

Mutual exclusion is a little more elaborate and some auxiliary definitions are needed:

a. TYPE act_queue; This is the type of variable capable of holding a FIFO queue of ACTIVITY numbers.

b. PROCEDURE add_back (VAR q: act_queue); Adds the current ACTIVITY to the back of the designated act_queue.

c. FUNCTION take_front (VAR q: act_queue): 0..63; Takes the ACTIVITY off the front of the designated act_queue.

A control_queue record type is introduced to provide points at which ACTIVITIEs may be held in a FIFO queue pending the availability of a 'resource' which is also needed by other ACTIVITIEs:

```
a. TYPE control_queue =
   RECORD
      count : INTEGER;
      queue : act_queue
   END;
``` where count is initialized to −1 and the queue is initialized to empty. The mutual exclusion facility is provided thus:

```
b. PROCEDURE join_cq (VAR cq : control_queue);
   BEGIN
      cq.count := cq.count + 1;
      IF cq.count <> 0 THEN
      BEGIN
         add_back (cq.queue);
         wait
      END
   END;
c. PROCEDURES leave_cq (VAR cq : control_queue);
   BEGIN
      IF cq.count <> 0 THEN
         stim (take_front (cq.queue));
      cq.count := cq.count − 1
   END;
```

The cross stimulation and mutual exclusion primitives provide all that is needed to support synchronous interactions within a single processor. They are compact and simple to implement.

Communication facilities, in the shape of CEC, ADPM, ROUTE designs and software executive, provide the means by which ACTIVITIEs in adjacent processors pass data from one to another. Our description here will concentrate on this particular shared memory configuration but it must be stressed that a ROUTE is a design abstraction which, without change to interface or process interaction properties, can also represent communications between ACTIVITIEs within a single processor, and communication between ACTIVITIEs located in processors which have no shared memory. Also the ROUTE is but one possible form of IDA communication, and alternative designs will often be needed to meet particular application requirements.

The interfaces to a ROUTE may be either procedural or dam, and in each case single items are inserted or extracted, and pass through the ROUTE unchanged, i.e. the operation of communicating through a ROUTE has no semantic effect whatsoever. However there are various dynamic possibilities:

a. Fully Asynchronous. The ROUTE is effectively a POOL where the writing and reading ACTIVITIEs can insert or extract data at any time, and these operations can be of any duration. The communication protocol is that of the four slot mechanism (see EP Patent Specification No 0292287) and data coherence and freshness are guaranteed. This is known as an fs_route.

b. Conditionally Asynchronous. The ROUTE is effectively a POOL operating a swung buffer protocol. Data coherence is guaranteed provided that the duration of reads is always less then the interval between writes and vice versa. This is known as a ts_route.

c. Loosely Synchronous. The ROUTE is effectively a two item MASCOT standard CHANNEL. It provides a message passing facility with a limited amount of buffering. This is known as a bb_route.

d. Fully Synchronous. The ROUTE is effectively operated as a rendezvous between the communicating processes.

It provides a message passing facility with no apparent buffering (although the ADPM space requirements for loosely and fully synchronous forms are identical). This is know as an rv_route.

As has already been mentioned, a given CEC is selected when its unique number appears in the data field of a particular write operation (at the same time all other CECs are deselected). In addition to the chip number in this write operation, a channel number is also selected. Each side of the current chip contains 16 channels, with each side of each channel containing the logic for:

a. counter (two bit) stepping
 b. counter (two bit) comparison
 c. transmit stim (multiplexed)×2
 d. receive stim (multiplexed)×2
 e. two slot async send
 f. two slot async receive
 g. four slot aysnc send
 h. four slot async receive This logic supports:

a. 16× bb-route OR rv_route, left to right OR right to left. The CEC logic allows for a total of 16 possible synchronous ROUTES (bb_route or rv_route), each of which either passes data in one direction or the other. The choice of ROUTE type and direction is exercised when the CEC logic is allocated to application communication functions. The counter stepping and inter processor stims for each channel are integrated on the chip to give the most compact operation (see below).
 b. 16× stim_only, left to right AND right to left. A further 16 inter processor stims in both directions are provided to allow additional synchronous ROUTEs to be built (by software).
 c. 16× ts_route and fs_route, left to right AND right to left. The CEC logic allows for 16 fully and 16 conditionally asynchronous ROUTEs in both directions, 64 ROUTEs in all.

The chip and channel selection operation, needed at the start of any communication procedure or data access involving the CEC, also sets the 'mode' of the chip so that it can execute the appropriate individual operations in support of a particular communication protocol. The mode is defined as follows:

a. TYPE mode=(stims, fs_rd, fs_wr, init, ts_wr, ts_rd, test, sync);

The selection operation can now be written:

a. PROCEDURE cec_select (chip: 0..7; chan: 0..31; m: mode);

The chip parameter lies in the range 0..7 because the current CEC allows 1 of 8 chips (all at the same address) to be selected. The chan parameter lies in the range 0..31 because transmit and receive stim facilities are 32 channels wide; 16 stims in each direction are intimately associated with the counter stepping logic, with a further 16 in each direction supporting stim_only.

All types of ROUTE require data space to be allocated within the ADPM associated with the CEC. The reasonably large number and variety of ROUTE types supported by the CEC allows considerable flexibility in the choice of ROUTEs. Like the KEC, CEC operations all execute in a single memory access.

The CEC provides a number of operations to support a four slot fully asynchronous protocol:

a. PROCEDURE cec_fs_rd_pr1; This is the operation which chooses a slot pair for reading.
 b. PROCEDURE cec_fs_rd_pr2; This is the operation which chooses the slot within the pair for reading.
 c. FUNCTION cec_fs_rd_slot: 0..3; This is the operation which returns the number of the slot to be read from next. It is dependent on the results from the previous two operations both of which are potentially asynchronous, and hence in theory metastability is a hazard. In practice, at computer rates of operation, the chip design and the delay before the slot number is read are such that metastability is effectively eliminated.
 d. PROCEDURE cec_fs_wr_pw1; This is the operation which indicates the slot containing the latest data in the chosen pair, and which also determines the slot in the chosen pair that will be written to next.
 e. PROCEDURE cec_fs_wr_pw2; This is the operation which indicates the pair which contains the latest data and which chooses the pair that will be written to next.
 f. FUNCTION cec_fs_wr_slot; This is the operation which returns the number of the slot to be written to next. It is dependent on the results from the previous two operations, the second of which is potentially asynchronous and hence again is theoretically vulnerable to metastability. In practice the chip design and method of use eliminate this hazard.

All these operate on the chip, channel and mode preselected by cec_select.

A fully asynchronous ROUTE requires an appropriate four slot array to be declared in the ADPM, and we will assume that the data to be passed is of type DATA. The ROUTE can be represented thus:

```
a. VAR data : ARRAY[0 .. 3] OF DATA;
   FUNCTION fs_read : DATA;
   BEGIN
       cec_select (chip, chan, fs_rd);
       cec_fs_rd_pr1;
       cec_fs_rd_pr2;
       fs_read := data [cec_fs_rd_slot]
   END;
b. PROCEDURE fs_write (VAR item : DATA);
   BEGIN
       cec_select (chip, chan, fs_wr);
       data [cec_fs_wr_slot] := item;
       cec_fs_wr_pw1;
       cec_fs_wr_pw2
   END;
```

These reading and writing operations illustrate the interactions with the CEC. They do not indicate the way in which the appropriate chip and chart parameters are associated with the cec_select calls; this is arranged by the network building software and is beyond the scope of this application. A further important point concerns initialization, and it is necessary to ensure that the data array in the ADPM is initialized so that any read occurring before the first write will not receive erroneous values.

The two slot conditionally asynchronous protocol has its own special operations. On the reading side there is one operation to choose the slot and one to return the number of the next slot to be read. On the writing side, the indication of the latest data and the return of the slot number for writing are combined into a single operation. This means that the writing procedure must remember the slot number between calls (indicated by the OWN variable below). The ROUTE can be represented thus (assuming appropriate initialization and cec_select parameterization):

```
a. VAR data : ARRAY [0 . . 1] OF DATA;
   FUNCTION ts_read : DATA;
   BEGIN
       cec_select (chip, chan, ts_rd);
       cec_ts_rd_pr;
       ts_read := data [cec_ts_rd_slot]
   END;
   PROCEDURE ts_write (VAR item : DATA);
   OWN next : 0 . . 1;
   BEGIN
       cec_select (chip, chan, ts_wr);
       data [next] := item;
       next := cec_ts_wr_pw_slot
   END;
```

The mechanism for handling inter processor stims involves CEC and executive software functions. There are two levels of external stim, primary and secondary. Primary stims are generated by CEC operations on one side of the chip and are transmitted through to the other to be held on the KEC whence they are introduced into the schedule and can cause an ACTIVITY to run (see above). There are 32 secondary stims associated with each primary stim and an operation is provided to interrogate them:

a. FUNCTION cec_next: 0..32; This is used to search for secondary stims. The set of outstanding secondary stims is latched on the preceding cec_select operation and each channel is examined in turn. When a stim is found its number is returned, and at the same time it is cleared. When there are no further secondary stims the number 32 is returned.

This operation is used by an executive ACTIVITY whose function it is to pass the secondary stim through to an appropriate control_node where it will in turn cause an application ACTIVITY to be scheduled. This can be represented thus:

```
a. VAR xstim : ARRAY [0 . . 7, 0 . . 31] OF control_node;
   ACTIVITY exec;
   VAR next : 0 . . 32;
   BEGIN
   WHILE TRUE DO
   BEGIN
       cec_select (chip, chan, stims);
       next := cec_next;
       WHILE next <> 32 DO
       BEGIN
           stim_cn (xstim [chip, next]);
           next := cec_next
       END;
       wait
   END
   END;
```

An exec ACTIVITY must be installed for each CEC, and its initial context must be set into the context saving area so that it is scheduled as a result of the first appropriate primary external stim. Thereafter it will wait whenever it has completed the task of interrogating the secondary stims, and having rescheduled the relevant application ACTIVITIEs via the xstim array. Clearly there will be some uncertainty as to the time taken between the raising of an external stim in one processor and its use to schedule an ACTIVITY in another. The outer bound of this delay is calculable from a knowledge of the longest slice time (i.e. interval between reschedule points) of all ACTIVITIEs in a processor, together with the slice times of the other ACTIVITIEs at the highest priority level. The xstim declaration assumes a full complement of 8 CECs with a need for 32 channels on each.

It is extremely unlikely that this capacity could ever be serviced by a single processor and the space allocated for these control_nodes would be kept to just that required for the application in hand.

The synchronous ROUTEs between adjacent processors make use of the inter processor stim facility just described, and in addition they are supported by CEC logic in the form of two bit counters, together with counter stepping and testing operations:

a. FUNCTION cec_inc_stim; This increments the counter for this side (i.e. from which the operation is executed) of the selected channel on the selected chip, and it generates an external stim (both levels). A number in the range 0..1 is returned this being the new counter value MOD 2, indicating the slot to be next accessed for data transfer.

b. FUNCTION cec_sync_p0; This returns 0 if the counter on this side equals the counter on the other side plus zero, i.e. the two counters are the same; otherwise 1 is returned.

c. FUNCTION cec_sync_p2; This returns 0 if the counter on this side equals the counter on the other side plus two; otherwise 1 is returned.

The counters each step through the range 0..3 and are used to indicate full and empty conditions in a two slot MASCOT standard CHANNEL. Initialization of the counters is effected using an operation which steps the counter without generating a stim. For a bounded buffer ROUTE the counters are initialized to zero, and the xstim array elements (control nodes) associated with a synchronous ROUTE must be initialized to the 'unstimmed' state. The ROUTE can be represented thus (assuming appropriate cec_select parameterization and OWN variables initialized to zero):

```
a. VAR data : ARRAY [0 . . 1] OF DATA;
   FUNCTION bb_read : DATA;
   OWN oc : 0 . . 1;
   BEGIN
       cec_select (chip, chan, sync);
       WHILE cec-sync_p0 = 0 DO
       BEGIN
           wait_cn (xstim [chip, chan]);
           cec_select (chip, chan, sync)
       END;
       bb_read := data [oc];
       oc := cec_inc_stim
   END;
   PROCEDURE bb_write (VAR item : DATA);
   OWN ic : 0 . . 1;
   BEGIN
       cec_select (chip, chan, sync);
       WHILE cec_sync_p2 = 0 DO
       BEGIN
           wait_cn (xstim [chip, chan]);
           cec_select (chip, chan, sync)
       END;
       data [ic] := item;
       ic := cec_inc_stim
   END;
```

The implementation of a fully synchronous ROUTE is found to be very similar to a loosely synchronous ROUTE. The CEC must be initialized so that the counter on the writing side is 1 and the counter on the reading side is 0. Likewise the ie OWN variable must be initialized to 1. The ROUTE is represented thus:

```
a. VAR data : ARRAY [0 .. 1] OF DATA;
   FUNCTION rv_read : DATA;
   VAR oc : 0 .. 1;
   BEGIN
      cec_select (chip, chan, sync);
      oc := cec_inc_stim;
      WHILE cec_sync_p0 = D0
      BEGIN
         wait_cn (xstim [chip, chan]);
         cec_select (chip, chan, sync)
      END;
      rv_read := data [oc]
   END;
   PROCEDURE rv_write (VAR item : DATA);
   OWN ic : 0 .. 1;
   BEGIN
      cec_select (chip, chan, sync);
      data [ic] := item;
      ic := cec_inc_stim;
      WHILE cec-sync_p2 = 0 D0
      BEGIN
         wait_cn (xstim [chip,chan]);
         cec_select (chip, chan, sync)
      END
   END;
```

It can now be seen that the counter logic on each side of the CEC can be used to support ROUTEs in either direction (but not both), and that each ROUTE can be programmed as either a bb_route or an rv_route. The software build would determine which of these options is chosen.

We have seen how the executive chips and lower level software can be used to execute real time networks. We will now briefly examine the way in which designs may be created in a form suitable for loading into such an execution environment.

The described and illustrated DIA system is preferably used in conjunction with a software/digital system development which will be referred to herein by the acronym DORIS (Data Orientated Requirements Implementation Scheme). The emphasis in DORIS is on the data passed between functions and components in a system. Exchange of data is a unifying theme and, by applying; this principle right through from Requirements Analysis to Implementation Execution, traceability throughout the development process is ensured. A very important further advantage is the ability to analyse a proposed implementation for its performance properties. This arises from the distributed nature of the approach which immediately reduces the reliance on dynamically managed shared resources, a well-known hazard and one which it may not be possible to resolve satisfactorily in systems where many disjoint processing functions are crammed into a small number of powerful and complex computers, and where communications are multiplexed onto a small number of high bandwidth links.

Figure 3:
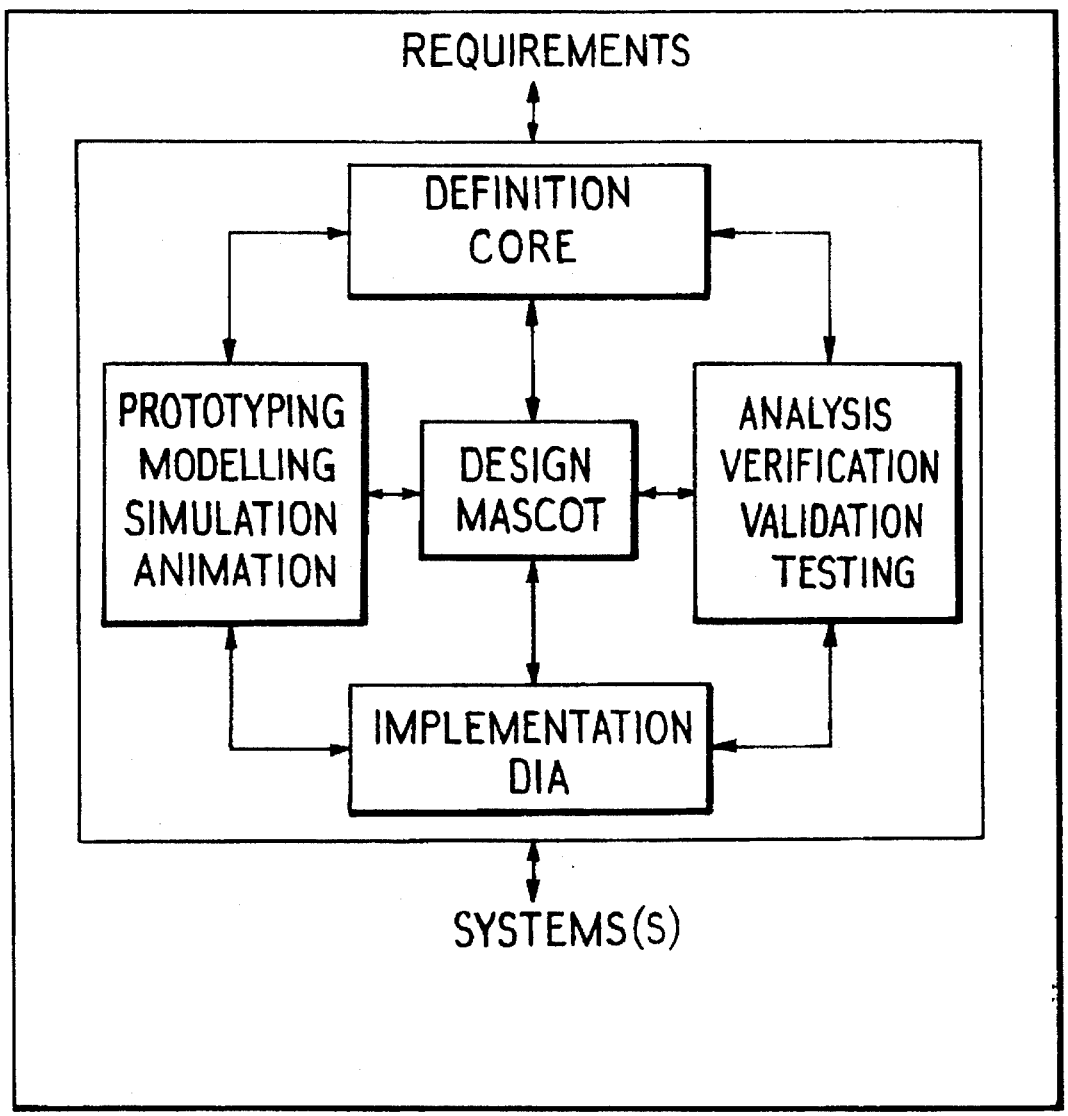
FIG. 3 is a diagram for explaining the use of the FIG. 2 system in the context of an integrated hardware/software development environment.

The essence of the DORIS approach is illustrated in FIG. 3. Requirements Analysis leading to top level System Definition is carried out using CORE (COntrolled Requirements Expression), a method which places great emphasis on identifying the information exchanged between well-defined functions. Information about CORE may be found in "CORE —A method for Controlled Requirements Specification" by G. P. Mullery in the Proceedings of Fourth International Conference on Software Engineering, 1979, pp 126–135. The Design phase is carried out in terms of an adapted form of MASCOT. The principal extension to MASCOT is the introduction of type parameters for templates (a template is a design description used to institute component elements in a system). The primary motivation for this extension is to allow generic designs for ROUTEs instead of having to create a new ROUTE template for every type of data communicated in this way. The Implementation phase is based on DIA as described herein.

FIG. 3 includes two further blocks. Prototyping, Modelling, Simulation and Animations will assist with the creative process of Definition and Design, and with the investigation of proposed solutions by experimental Implementation. Analysis, Verification, Validation and Testing are the means by which the product of a phase of development may be assessed for conformance with previous phases.

The real time network is a form of design abstraction which in principle is free from implementation concerns. In practice, in the field of real time embedded multi-processor system, the design is likely to be quite heavily influenced by performance considerations, and by the way in which the design will have to be mapped into available execution resources. Nevertheless we strive to maximize abstraction for the clarity, flexibility, generality, maintainability, reusability, etc., which this brings.

A DORIS design is expressed as a pure network, with no explicit relationship to execution hardware. The execution environment is separately described using a Hardware Description Language which allows the available processors and memory, and their interconnections, to be defined. A Mapping Description is then used to relate the network to the hardware. This approach offers considerable promise for the development of effective performance analysis tools.

The DORIS design mapping rules are very straightforward:

a. An ACTIVITY must be contained with a single processor.

b. An IDA design must exist for any inter-ACTIVITY communication implied by the mapping of the ACTIVITIEs into the hardware.

The second rules arise because mapping is expressed purely in terms of location of ACTIVITIEs, with the required form of the IDAs, in terms of their distribution in the hardware, being derived from this. For example, if a writer communicates with a reader through a ROUTE the IDA design needed depends on whether the two processes are in the same processor, or are in adjacent processors, or are even further apart. The DORIS toolset handles this situation by a Template Substitution technique. In network terms the external specification and the function from the application viewpoint remain the same whatever template is substituted; however, the internal design differs and some additional network connections to executive facilities may be needed.

It has been stated that the process interaction properties of a ROUTE remain the same regardless of how the ROUTE is mapped into the execution hardware. This means that the asynchronous forms remain asynchronous with the same sort of timing constraints or lack of them, and likewise the synchronous forms remain the same in terms of providing buffering or rendezvous characteristics. However, information propagation delays will increase as the ROUTE becomes distributed over wider areas. It is only the general nature of the interaction which remains constant, but this is important because it opens the door to generalized timing analyzers which can work in terms of timing parameters determined in a direct manner by consideration of the execution environment and network distribution.

Each KEC 46 and each CEC 48 may comprise a custom designed Integrated Circuit. To provide processor independence the chips CEC and KEC may have TTL compatible Inputs and Outputs and be accessed via conventional memory read and write operations.

The KEC supports the co-operative scheduling of activities, within a single processor, under software control and handles the asynchronous external stimuli that may be used to replace the pre-emptive interrupts used in conventional microprocessors. The KEC contains an activity matrix and ripple search logic to identify the next schedulable, primed activity against a fixed rule set. Activities are designated schedulable and primed under software control. Asynchronous external stimuli are latched on chip, but can only be prime activities In the matrix under software control. Not until they have safely primed an activity in the matrix are these latches cleared. The KEC uses an unconventional read strobe to allow the chip logic to operate in parallel, asynchronously, one step ahead of the processor. The KEC uses a novel design in the "round robin" member search logic within the prioritised set search when selecting the next activity.

As noted, each KEC 47 supports the scheduling of processing tasks, termed activities, for an individual, multitasking processor. It will provide, on request, the number of the next activity to be allocated processing time, under executive software control in the presence of external asynchronous stimuli.

By way of example, each KEC 47 might contain support for sixty-four activities, eight of which are associated with external stimuli. Activity numbers can be programmed to be included or excluded as candidates for scheduling, but the next activity number selection rules are fixed. There are eight priority levels with eight activity numbers of each priority. Search logic identifies the next included activity number on a round robin basis, in the highest priority level containing an included activity number.

The CEC enables asynchronous hardware coupling between processor pairs, where each processor may be operating in an independent time frame. Each CEC holds and manipulates variables under software control from each processor and generates an asynchronous external stimulus to each side. Used in conjunction with Asynchronous Dual Port Memory (ADPM), each CEC can support many parallel asynchronous or synchronous software communication routes, established in the ADPM between the processor pairs.

Each CEC 48 may comprise a custom VLSI chip which contains variables and logic to support the concurrent use of various types of shared memory communication mechanisms, between a pair of asynchronously operating processors. The mechanisms steer writing and reading processes to data areas, termed slots, located in the Asynchronous Dual Port Memory (ADPM) 46, that is connected in parallel with the CEC. For example, the CEC may be designed to support the concurrent use of sixteen inter-processor channels, each channel supporting the concurrent use of: two four-slot mechanisms (one in each direction); two two-slot mechanisms (one in each direction); and a message passing mechanism (that can be used in either direction). Handling for sixty-four stimulii (thirty-two in each direction) may be provided.

Preferably each CEC has two completely independent processor interfaces designated L and R (Left and Right), allowing connection between two asynchronous operating processors, with no mutual access restrictions.

The CEC can be connected between two processors that have independent clocks. Each processor is allowed free access to its side of the CEC, without the need for hardware exclusion, arbitration or synchronization. The CEC is structured in two halves, with each half containing the circuitry associated with each processor. This consists of stimulus latches, shared bit variables and logic. Each stimulus latch can only be set from one side and can only be copied when identified to the processor. The latches that hold shared bit variables can only be set and cleared from one side, but accessed by the logic from both sides. The logic allows the CEC to search the copied stimulus latches, manipulate the stored variables in a particular fashion under software control and generate the asynchronous external stimulus.

We claim:

1. A distributed computer system comprising:

a plurality of asynchronous computer units each including a data processor and a private data memory linked to said data processor by way of a private data bus;

shared data memory means having a plurality of access ports linked between said private data buses of respective ones of said plurality of asynchronous computer units, said shared data memory means enabling any one of said plurality of asynchronous computer units to communicate with any other of said plurality of asynchronous computer units by way of a respective two-way data route comprising a respective individual area of shared data memory in said shared data memory means; and communication control means connected to said private data bus of each of said plurality of asynchronous computer units and to said shared data memory means for responding to control data issued by said processor of any one of said plurality of asynchronous computer units to initiate communication via a route determined by said processor of said one of said plurality of asynchronous computer units;

said shared data memory means and said communication control means together providing a fully asynchronous inter-communication channel to any two of said plurality of asynchronous computer units in which each of said two of said plurality of asynchronous computer units can access said respective shared data memory area fully asynchronously with respect to accesses by said other of said two of said plurality of asynchronous computer units.

2. A distributed computer system according to claim 1, wherein:

said shared data memory means comprises a plurality of asynchronously operable dual port memories, one of said plurality of dual port memories for each said two-way data route; and said communication control means comprises a plurality of communication control units connected to control respective ones of said plurality of dual port memories.

3. A distributed computer system according to claim 1, wherein:

each of said plurality of asynchronous computer units is programmed with activity scheduling software for initiating a periodic reference by said associated processor to a pre-designated memory area and for executing activities selected in dependence upon a data signal located at said pre-designated memory area;

said distributed computer system further including activity control means operable for receiving demand signals identifying respective activities to be carried out by respective ones of said plurality of asynchronous computer units and for registering said demand signals in said pre-designated memory area.

4. A distributed computer system according to claim 3, wherein said activity control means is connected to said communication control means for receiving said demand signals identifying activities including responses by responding ones of said plurality of asynchronous computer units to a communication request from other ones of said plurality of asynchronous computer units.

5. A distributed computer system according to claim 3, wherein said activity control means comprises, for each of said plurality of asynchronous computer units, a respective individual register unit connected to said associated private data bus of said asynchronous computer unit and occupying said pre-designated memory area associated with said asynchronous computer unit.

6. A distributed computer system according to claim 1, wherein said plurality of asynchronous computer units are programmed with activity scheduling software and with respective sets of software modules for causing said plurality of asynchronous computer units to execute associated predetermined activities, said software modules being selected for running by said activity scheduling software and said software modules including communication processes which are operable for passing data between modules which run in a same one of said plurality of asynchronous computer units and for passing data between modules which run in respective ones of two different ones of said plurality of asynchronous computer units, by way of said two-way data route.

7. A distributed computer system according to claim 6, wherein said activity scheduling software causes said computer units to generate predictably timed responses to asynchronous external demands to said plurality of asynchronous computer units.

8. A distributed computer system according to claim 6, wherein said activity scheduling software programming a respective one of said plurality of asynchronous computer units deschedules a software process needing to wait, thereby freeing said respective one of said plurality of asynchronous computer units to run other software processes.

9. A distributed computer system according to claim 1, wherein:
said shared data memory means and said communication control means together make available to any two of said plurality of asynchronous computer units a less than fully asynchronous inter-communication channel in which there is a least some synchronization of accesses to said shared memory area by said two of said plurality of asynchronous computer units, wherein at least one of said fully asynchronous inter-communication channel and said less than fully asynchronous inter-communication channel is made available based on data issued to said communication control means by a respective one of said plurality of asynchronous computer units which initiates a communication.

10. A distributed computer system according to claim 1, wherein:
said communication control means and said shared memory means cooperate to permit a first one of two of said plurality of asynchronous computer units having a communication route established therebetween to store data to a respective individual area of shared data memory in said shared data memory means independently of a second one of said two of said plurality of asynchronous computer units and to permit said second one of said two of said plurality of asynchronous computer units to read data from said respective individual area of shared data memory in said shared data memory means independently of said first one of said two of said plurality of asynchronous computer units.

11. A distributed computer system according to claim 10, wherein at least a portion of said storing by said first one of said two Of said plurality of asynchronous computer units and at least a portion of said reading by said second one of said two of said plurality Of asynchronous computer units are performed concurrently.

12. A distributed computer system according to claim 1, wherein a timing of said shared memory means is independent from a timing of said plurality of asynchronous computer units, thereby substantially eliminating mutual timing effects between any two of said plurality of asynchronous computer units having a communication route established therebetween.

13. A distributed computer system comprising:
a first and second asynchronous computer unit each including a data processor and a private data memory linked to said data processor by way of a private data bus;
shared data memory means having a first access port linked to said private data bus of said first asynchronous computer unit and having a second access port linked to said private data bus of said second asynchronous computer unit, an individual area of shared data memory of said shared data memory means enabling two-way communications between said first asynchronous computer unit and said second asynchronous computer unit; and
communication control means connected to said private data bus of each of said first and second asynchronous computer units and to said shared data memory means for responding to control data issued by said processor of any one of said first and second asynchronous computer units to initiate said two-way communications between said first and second asynchronous computer units;
said shared data memory means and said communication control means together providing a fully asynchronous inter-communication channel between said first and second asynchronous computer units in which either one of said first and second asynchronous computer units can access said respective shared data memory area fully asynchronously with respect to accesses by the other other one of said first and second asynchronous computer units.

14. A distributed computer system according to claim 13, wherein:
said shared data memory means comprises a plurality of asynchronously operable dual port memories, one of said plurality of dual port memories for each said two-way data route; and
said communication control means comprises a plurality of communication control units connected to control respective ones of said plurality of dual port memories.

15. A distributed computer system according to claim 13, wherein said first and second asynchronous computer units are programmed with activity scheduling software and with respective sets of software modules for causing said first and second asynchronous computer units to execute associated predetermined activities, said software modules being selected for running by said activity scheduling software and said software modules including communication processes which are operable for passing data between modules which run in a same one of said first and second asynchronous computer units and for passing data between modules which run in both said first and second asynchronous computer units, by way of said two-way data route.

16. A distributed computer system according to claim 13, wherein:

said shared data memory means and said communication control means together make available to said first and second asynchronous computer units a less than fully asynchronous inter-communication channel in which there is a least some synchronization of accesses to said shared memory area by said first and second asynchronous computer units, wherein at least one of said fully asynchronous inter-communication channel and said less than fully asynchronous inter-communication channel is made available based on data issued to said communication control means by a respective one of said first and second asynchronous computer units which initiates a communication.

* * * * *